United States Patent
Kawamura et al.

Patent Number: 5,708,083
Date of Patent: Jan. 13, 1998

[54] PROPYLENE POLYMER ETHYLENE/OLEFIN RUBBER AND POLYETHYLENE BLOCK COPOLYMER

[76] Inventors: Takanobu Kawamura, 8890, Goi, Ichihara-shi; Katsuhiko Ohno, 17, Tatsumidai-Higashi 2-chome, Ichihara-shi; Osamu Kojima, 17, Tatsumidai-Higashi 2-chome, Ichihara-shi; Kouichi Hatada, 17, Tatsumidai-Higashi 2-chome, Ichihara-shi; Shinei Gima, 17, Tatsumidai-Higashi 2-chome, Ichihara-shi, all of Chiba; Takao Nomura, 114-169, Sakanose, Kosema-cho, Toyota-shi; Takeyoshi Nishio, 55-39, Kamiohbari, Hosokawa-cho, Okazaki-shi, both of Aichi, all of Japan

[21] Appl. No.: 799,988

[22] Filed: Feb. 13, 1997

Related U.S. Application Data

[63] Continuation of Ser. No. 558,220, Nov. 17, 1995, abandoned, which is a continuation of Ser. No. 508,888, Jul. 28, 1995.

[30] Foreign Application Priority Data

Aug. 2, 1994 [JP] Japan .................................. 6-181417
Aug. 2, 1994 [JP] Japan .................................. 6-181418

[51] Int. Cl.$^6$ .............................. C08L 23/12; C08L 23/14; C08L 53/00
[52] U.S. Cl. .................................. 525/89; 525/88; 525/95; 524/451; 524/505
[58] Field of Search ................... 525/88, 89, 323, 525/95; 524/451, 505

[56] References Cited

U.S. PATENT DOCUMENTS

| | | | |
|---|---|---|---|
| 4,226,952 | 10/1980 | Halasa et al. | 525/192 |
| 4,237,245 | 12/1980 | Halasa et al. | 525/272 |
| 5,147,933 | 9/1992 | Koizumi et al. | 525/88 |
| 5,308,908 | 5/1994 | Fukui et al. | 525/88 |
| 5,374,677 | 12/1994 | Nishio et al. | 525/88 |

FOREIGN PATENT DOCUMENTS

| | | |
|---|---|---|
| 59-37294 | 9/1984 | Japan . |
| 62-45883 | 9/1987 | Japan . |
| 1-168743 | 7/1989 | Japan . |
| 1-168744 | 7/1989 | Japan . |
| 4-342752 | 11/1992 | Japan . |
| 5-132606 | 5/1993 | Japan . |

*Primary Examiner*—Robert E. Sellers
*Attorney, Agent, or Firm*—Leydig, Voit & Mayer, Ltd.

[57] ABSTRACT

A polyolefin resin composition is disclosed which comprises
(a) a crystalline propylene polymer in an amount of 40% or more to less than 95% by weight,
(b) an ethylene/α-olefin rubber in an amount of from 5 to 40% by weight, and
(c) a linear or branched specified block copolymer in an amount of from 0.1 to 20% by weight containing a polyethylene block segment A having a melting temperature as measured with a differential scanning calorimeter of from 80° to 120° C. and an ethylene/α-olefin copolymer block segment B, the total content of components (a), (b), and (c) being 100% by weight, which composition has excellent dispersibility of the rubber used, so that moldings having an excellent balance between rigidity and impact resistance are obtained therefrom, and is hence suitable for use in the field of moldings required to have rigidity and impact resistance.

11 Claims, No Drawings

PROPYLENE POLYMER ETHYLENE/ OLEFIN RUBBER AND POLYETHYLENE BLOCK COPOLYMER

This is a continuation of application Ser. No. 08/558,220 filed on Nov. 17, 1995 now abandoned, which is a division of patent application Ser. No. 08/508,888, filed Jul. 28, 1995, pending.

FIELD OF THE INVENTION

The present invention relates to a polyolefin resin composition. More particularly, this invention relates to a polyolefin resin composition comprising a blend of a crystalline propylene polymer and an ethylene/α-olefin rubber and having an excellent balance between rigidity and impact resistance due to the use of a specified block copolymer as a compatibilizing agent for the blend.

The present invention also relates to a resin composition for interior automotive trim parts, more particularly a resin composition for interior automotive trim parts which has excellent flowability and provides moldings excellent in rigidity and impact resistance.

BACKGROUND OF THE INVENTION

Polypropylene resins are excellent in rigidity and high-temperature rigidity, and are extensively used not only in automotive applications but in fields such as domestic electrical appliances, miscellaneous goods, films, etc. However, since polypropylene resins have poor impact resistance, the range of the use thereof is still limited.

Several techniques are presently being employed for improving impact resistance of moldings. One representative technique is to use the propylene/ethylene block copolymer as a polypropylene, and another is to blend an elastomer such as an ethylene/α-olefin rubber with polypropylene. These resins are used mainly in applications such as automotive bumpers and interior automotive trim parts including instrument panels, if necessary an inorganic filler, e.g., talc, is incorporated in the resins. Although the impact resistance of polypropylene resins was improved by these techniques, this improvement has resulted in reduced rigidity and high-temperature rigidity and also in a decrease in flowability due to the incorporation of a large amount of rubber. Because of this, attention in material development is focused on how to improve impact resistance without sacrificing any of rigidity, high-temperature rigidity, and flowability.

Among several methods proposed for eliminating the above-described problem is a technique in which a small particle size of an ethylene/α-olefin rubber dispersed and incorporated into a crystalline polypropylene during compounding besides polymerization is reduced to thereby enable the rubber to function effectively and to thus reduce the addition amount of the rubber. However, the presently attainable average particle size of dispersed rubbers is usually from about 2 to 5 μm, and it is difficult to finely disperse a rubber to a particle size of 1 μm or less with the current melt-kneading technique even when the compatibility of the rubber with the polypropylene resin is taken into account. In this point, the utilization of a rubber is not fully effective. Further, the resin composition containing an ethylene/α-olefin rubber has the drawback that the separation between the polypropylene resin phase and the rubber phase may proceed during residence with heating at the time of molding and, as a result, the dispersed rubber particles enlarge to about 5 to 10 μm, leading to a considerable decrease in impact resistance and tensile elongation and a decrease in other physical properties.

Also known are a technique in which a propylene/-ethylene block copolymer improved in the stereoregularity of the propylene homopolymer part is used in order to enhance the reduced rigidity and high-temperature rigidity (JP-B-1-254706 and JP-A-62-187707) and a technique of incorporating an inorganic filler such as talc into a polypropylene resin. (The terms "JP-B" and "JP-A" as used herein mean an "examined Japanese patent publication" and an "unexamined published Japanese patent application," respectively.) Of these methods, the technique of improving the stereoregularity of a propylene homopolymer part of propylene/ethylene block copolymer is useful because this can improve rigidity and high-temperature rigidity without increasing the specific gravity. The technique of incorporating talc is not suitable for practical use since talc should be incorporated in a large amount and, as a result, not only the molded products obtained from the composition have an increased specific gravity and hence an increased weight, but also the resulting composition itself has impaired flowability.

On the other hand, several attempts have been made to incorporate a hydrogenated specified block copolymer into a polypropylene resin for the purposes of improving impact resistance, and preventing occurrence of whitening, etc. For example, the incorporation of a hydrogenated styrene/-butadiene block copolymer into a polypropylene resin and a composition obtained by incorporating an inorganic filler into the resulting resin composition have been proposed.

Moreover, a resin composition obtained by incorporating a hydrogenated polybutadiene into a polypropylene resin is disclosed in JP-B-59-37294, and a diblock copolymer comprising a hydrogenated polybutadiene is disclosed in JP-B-62-45883. Furthermore, JP-A-4-342752 and JP-A-5-132606 disclose a resin composition obtained by incorporating a block copolymer comprising a hydrogenated polybutadiene into a polypropylene or polyethylene resin. JP-A-1-168743 and JP-A-1-168744 disclose a resin composition obtained by incorporating a hydrogenated isoprene/butadiene block copolymer into a polypropylene or polyethylene resin.

Although these resin compositions can improve both of occurrence of whitening and impact resistance, they have problems, for example, that the rigidity and high-temperature rigidity thereof are impaired considerably for the improvement in impact resistance. The applications in practical use of those proposed resin compositions are hence limited to the field of soft moldings, etc.

SUMMARY OF THE INVENTION

As apparent from the above description, an object of the present invention is to provide a polyolefin resin composition having a well-balanced combination of impact resistance, rigidity, and flowability.

Another object of the present invention is to provide a resin composition for interior automotive trim parts which has excellent flowability and gives moldings excellent in rigidity and impact resistance.

The present inventors made intensive studies in order to eliminate the problems described above. As a result, they have found that a polyolefin resin composition having an excellent balance between impact resistance and rigidity is obtained when a specified block copolymer having a crystalline polyethylene block segment and a soft ethylene/-α-olefin copolymer block segment is incorporated as a compatibilizing agent for a crystalline propylene polymer and an ethylene/α-olefin rubber. It has also been found that a polypropylene resin composition for producing interior automotive trim parts which is excellent in flowability, rigidity, and impact resistance is obtained by incorporating the specified block copolymer into a composition comprising a highly crystalline propylene/ethylene block copolymer having a specific degree of intramolecular stereoregularity, an ethylene/α-olefin rubber, and talc. The present invention has been achieved based on these findings.

The present invention resides in the following items:

(1) A polyolefin resin composition comprising
 (a) a crystalline propylene polymer in an amount of 40% or more to less than 95% by weight,
 (b) an ethylene/α-olefin rubber in an amount of from 5 to 40% by weight, and
 (c) a linear or branched specified block copolymer in an amount of from 0.1 to 20% by weight containing a polyethylene block segment A having a melting temperature as measured with a differential scanning calorimeter of from 80° to 120° C. and an ethylene/α-olefin copolymer block segment B,
 the total content of components (a), (b), and (c) being 100% by weight.

(2) The polyolefin resin composition as described in (1) above, wherein the crystalline propylene polymer (a) is at least one member selected from the group consisting of a crystalline propylene homopolymer and a crystalline propylene/ethylene block copolymer.

(3) The polyolefin resin composition as described in (1) above, wherein the ethylene/α-olefin rubber (b) is at least one member selected from the group consisting of an ethylene/propylene rubber and an ethylene/butene-1 rubber.

(4) The polyolefin resin composition as described in (1) above, wherein the ethylene/α-olefin copolymer block segment B is at least one member selected from the group consisting of an ethylene/butene copolymer and an ethylene/propylene copolymer.

(5) A resin composition for interior automotive trim parts which comprises
 (a') a highly crystalline propylene/ethylene block copolymer in an amount of 50% or more to less than 80% by weight obtainable by homopolymerizing propylene to produce as a first-stage polymer, a propylene homopolymer which has a melt flow rate (MFR) of from 80 to 500 g/10 min and in which the relationship between the MFR and the pentad isotactic index (P) thereof satisfies the following expression $$1.00 \geq P \geq 0.015 \log MFR + 0.945$$

and then polymerizing propylene and ethylene with the first-stage polymer in at least one step in such amounts as to result in an ethylene content of 10% by weight or less based on the total polymer amount,
 (b) an ethylene/α-olefin rubber in an amount of from 5 to 40% by weight,
 (c) a specified block copolymer in an amount of from 0.1 to 20% by weight containing a polyethylene block segment A having a melting temperature as measured with a differential scanning calorimeter of from 80° to 120° C. and an ethylene/-α-olefin copolymer block segment B, and
 (d) talc in an amount of from 15 to 30% by weight,
 the total content of components (a'), (b), (c), and (d) being 100% by weight.

(6) The resin composition for interior automotive trim parts as described in (5) above, wherein the ethylene/-α-olefin rubber (b) is at least one member selected from the group consisting of an ethylene/propylene rubber and an ethylene/butene-1 rubber each having an ethylene content of 45% by weight or more.

(7) The resin composition for interior automotive trim parts as described in (5) above, wherein the ethylene/-α-olefin copolymer block segment B is at least one member selected from the group consisting of an ethylene/butene copolymer and an ethylene/propylene copolymer.

(8) The resin composition for interior automotive trim parts as described in (5) above, wherein the talc (d) is ultrafine talc which has an average particle size of 2 μm or less and in which the content of particles having a size of 4 μm or more is 4% by weight or less.

(9) The resin composition for interior automotive trim parts as described in (5) above, which has an MFR (ASTM D1238) of 20 or more and gives a molding having a flexural modulus at ordinary temperature (ASTM D790) of 2,200 MPa or more, a heat distortion temperature (ASTM D648; load, 1,820 kPa) of 70° C. or more, and an Izod impact strength at ordinary temperature (ASTM D256) of 150 J/m or more.

DETAILED DESCRIPTION OF THE INVENTION

The crystalline propylene polymer (a) in the composition of the present invention is at least one member selected from the group consisting of a crystalline propylene homopolymer, a crystalline propylene/ethylene block copolymer, and a crystalline propylene/α-olefin random copolymer. Preferred of these is a crystalline propylene homopolymer and/or a crystalline propylene/ethylene block copolymer.

The molecular weight of the crystalline propylene polymer is not particularly limited. The melt flow rate (MFR; 230° C., 2.16-kg load) thereof is from 0.01 to 500 g/10 min, preferably from 1 to 500 g/10 min, more preferably from 20 to 200 g/10 min.

This crystalline propylene polymer (a) is effective in improving rigidity and high-temperature rigidity. The content thereof in the composition is 40% or more to less than 95% by weight, preferably 50% or more to less than 95% by weight, based on the total amount of components (a), (b) and (c). When the content thereof is less than 40% by weight, rigidity and high-temperature rigidity of moldings decrease. When the content thereof is 95% by weight or more, the effect of improving impact resistance of moldings becomes insufficient.

The highly crystalline propylene/ethylene block copolymer (a') used in this invention can be obtained, for example, by the method described in, e.g., JP-B-1-254706 and JP-A-62-187707. Namely, polymerization of propylene is conducted as the first stage to produce a propylene homopolymer, which has a melt flow rate of from 80 to 500 g/10 min and in which the relationship between the melt flow rate (MFR) and the pentad isotactic index (P) as an indication of intramolecular stereoregularity satisfies the expression $1.00 \geq P \geq 0.015 \log MFR + 0.945$. Since higher MFR's tend to result in higher values of P, the MFR of the propylene homopolymer should be from 80 to 500 g/10 min. In the subsequent stage, ethylene and propylene are copolymerized in at least one step. The term "one step" herein means the polymerization operation corresponding to one act of feeding these monomers continuously or at a time. The propylene/ethylene copolymer part produced by the copolymerization in this stage should have an ethylene content of 10% by weight or less based on the total amount of the whole copolymer. The MFR described above is measured in accordance with ASTM D1238 at 230° C. and a load of 2.16 kg. The ethylene content described above is measured by infrared absorption spectrometry.

The term "pentad isotactic index (P)" used herein means the index of isotactic pentads in polypropylene molecular chains which is determined by $^{13}$C-NMR according to the method proposed by A. Zambelli et al. in *Macromolecules*, Vol. 6, No. 6, November-December, pp. 925–926 (1973). Namely, this index means the index of five successive propylene monomer units bonded in an isotactic manner. In the aforementioned examination by NMR, the assignment of peaks is determined according to the method proposed in *Macromolecules*, Vol. 8, No. 5, September-October, pp. 687–689 (1975). For the NMR analyses conducted in the examples which will be described later, a FT-NMR apparatus was used at 270 MHz, and the results of 27,000 measurements were accumulated to improve the signal detection limit to 0.001 in terms of pentad isotactic index. When a crystalline propylene/-ethylene block copolymer in which the index (P) is below 0.945 is used, the resulting composition gives moldings whose rigidity and high-temperature rigidity are low for the improved flexural modulus and impact resistance thereof. Specifically, such moldings cannot satisfy the flexural modulus (ordinary temperature) of 2,200 MPa or more and the heat distortion temperature (load, 264 Psi) of 70° C. or more which are desired rigidity properties required of interior automotive trim parts. The melt flow rate of the propylene homopolymer part is from 80 to 500 g/10 min, preferably from 100 to 300 g/10 min. When the melt flow rate thereof is less than 80 g/10 min, the composition obtained has reduced flowability. When the melt flow rate thereof exceeds 500 g/10 min, the composition obtained gives moldings having significantly reduced impact resistance.

The highly crystalline propylene/ethylene block copolymer is not particularly limited in its melt flow rate. However, the melt flow rate thereof is preferably from 10 to 150 g/10 min, more preferably from 20 to 80 g/10 min. Melt flow rates thereof less than 10 g/10 min are undesirable in that the composition obtained shows insufficient flowability when used in injection molding to produce interior automotive trim parts. Melt flow rates thereof exceeding 150 g/10 min are undesirable in that the moldings obtained have reduced impact resistance.

The content of the highly crystalline propylene/-ethylene block copolymer in the composition is 50% or more to less than 80% by weight, based on the total amount of components (a'), (b), (c), and (d). Contents thereof less than 50% by weight result in a decrease in rigidity and high-temperature rigidity, while contents thereof not less than 80% by weight result in an insufficient effect of improving impact resistance.

The ethylene/α-olefin rubber (b) used in the composition of the present invention is at least one member selected from the group consisting of an ethylene/propylene rubber, an ethylene/butene-1 rubber, an ethylene/propylene/-butene-1 rubber, and ethylene/hexene rubber.

Preferred of these are an ethylene/propylene rubber and an ethylene/butene-1 rubber. These rubbers may be used in combination.

The ethylene/α-olefin rubber is not particularly limited in its molecular weight, and may have a Mooney viscosity, $ML_{1+4}(100°$ C.), of from 5 to 150. The ethylene content of the ethylene/α-olefin rubber is preferably from 25 to 90% by weight, more preferably from 45 to 90% by weight.

This ethylene/α-olefin rubber has the effect of improving impact resistance, and the content thereof is from 5 to 40% by weight, based on the total amount of components (a), (b), and (c) or components (a'), (b), (c), and (d). When the content thereof is less than 5% by weight, the effect of improving impact resistance is insufficient. When the content thereof exceeds 40% by weight, there is a fear that the resulting composition may be reduced in rigidity and high-temperature rigidity or have impaired flowability or may give moldings having a flow mark.

The specified block copolymer (c) used in the composition of this invention is represented by the formula A—B—A or A—B.

In the above formulae, A is a polyethylene block segment having a maximum melting temperature peak as measured with a differential scanning calorimeter (DSC) of from 80° to 120° C., while B is an ethylene/α-olefin copolymer block segment.

The polyethylene block A functions to enhance compatibility with ethylene/α-olefin rubbers. Polyethylene blocks having a melting temperature less than 80° C. are undesirable in that they have low crystallinity and bring about reduced compatibility.

The ethylene/α-olefin copolymer block segment B functions to enhance compatibility with polypropylene resins. This segment B is preferably an ethylene/butene copolymer or an ethylene/propylene copolymer. In the ethylene/butene copolymer, the ethylene content is from 20 to 80% by weight, preferably from 20 to 50% by weight.

In the composition of the present invention, the specified block copolymer (c) functions as a compatibilizing agent for enhancing the compatibility between the crystalline propylene polymer (a) or the highly crystalline propylene/-ethylene block copolymer (a') and the ethylene/α-olefin rubber (b) to thereby finely disperse the rubber to a particle size of 1 μm or less. Although a styrene/-ethylene/butene/ styrene block copolymer (SEBS) having relatively good compatibility with polyolefin resins is generally known as a compatibilizing agent for polypropylene resins, this block copolymer is almost ineffective in compatibilizing the propylene polymer or propylene/ethylene block copolymer with the ethylene/α-olefin rubber.

The content of the specified block copolymer in the composition is from 0.1 to 20% by weight, based on the total amount of components (a), (b), and (c) or components (a'), (b), (c), and (d). When the content thereof is less than 0.1% by weight, the block copolymer as a compatibilizing agent is less effective in dispersing the ethylene/α-olefin rubber, so that the effect of improving impact resistance is insufficient. On the other hand, when the content thereof exceeds 20% by weight, the polypropylene resin is plasticized and softened disadvantageously and, as a result, rigidity and high-temperature rigidity are reduced.

With respect to the specified block copolymer and processes for producing the same, examples thereof include a diblock copolymer comprising a polyethylene block and an ethylene/butene copolymer block and obtained by hydrogenating a butadiene block polymer which can be obtained by polymerizing 1,2-butadiene and 1,4-butadiene while controlling the selectivity thereof, as disclosed in JP-B-62- 45883; a linear or branched block copolymer comprising a polyethylene block and an ethylene/propylene copolymer block and is obtained by hydrogenating a butadiene/isoprene block copolymer, as disclosed in JP-A-1-168743; and a triblock copolymer comprising a polyethylene block, an ethylene/butene copolymer block, and a polyethylene block, as disclosed in JP-A-4-342752.

Preferred of these are the linear diblock copolymer comprising a polyethylene block and an ethylene/butene or ethylene/propylene copolymer block and the triblock copolymer comprising a polyethylene block, an ethylene/butene copolymer block, and a polyethylene block.

The talc used in the composition of this invention has the effect of improving the rigidity of moldings. It is important that the content of talc in the resin composition should be reduced to the minimum necessary amount, because talc may adversely influence the composition. Namely, the talc may impair the flowability of the composition, increase the specific gravity of the composition to give heavier products, and cause a flow mark on molding surfaces. The talc content is from 15 to 30% by weight based on the total amount of components (a'), (b), (c), and (d) in the composition. When the content thereof is less than 15% by weight, the composition gives moldings which are reduced in rigidity and high-temperature rigidity and hence incapable of retaining the flexural modulus of 2,200 MPa or more and the heat distortion temperature of 70° C. or more which properties are basic performances required of interior automotive trim parts. When the talc content exceeds 30% by weight, the moldings obtained tend to have a reduced tensile elongation at break or to have a flow mark on the surface thereof.

The talc contained in the composition of this invention is preferably ultrafine talc which has an average particle size of 2 µm or less and in which the content of particles having a size of 4 µm or more is 4% by weight or less. Incorporation of a talc powder which has an average particle size more than 2 µm or in which the content of particles having a size of 4 µm or more is more than 4% by weight is undesirable in that this reduces impact resistance, in particular plane impact resistance.

If desired and necessary, one or more of various additives such as mica, calcium carbonate, barium sulfate, glass fibers, magnesium sulfate, potassium titanate, wood flour, flame retardants, antioxidants, antistatic agents, colorants (pigments), nucleating agents, slip agents, release agents, ultraviolet absorbers, weathering agents, plasticizers, and free-radical generators may be suitably incorporated into the composition of this invention as long as the effects of the invention are not adversely influenced by the additives used.

The composition of the present invention can be produced, for example, by the following method. First, appropriate amounts of the necessary ingredients are mixed together along with a stabilizer and a colorant by means of a ribbon blender, tumbling mixer, Henschel mixer (trade name), supermixer, or the like. The resulting mixture is melt-kneaded with a roll mill, Banbury mixer, Labo Plastomill, single- or twin-screw extruder, or the like at a melt temperature of from 150° to 300° C., preferably from 180° to 250° C., and then pelletized.

The thus-obtained polyolefin resin composition of the present invention can be subjected to the production of various moldings by any of various molding techniques including injection molding, extrusion, vacuum forming, and pressure forming. Of these molding techniques, injection molding is preferably used for producing moldings from the composition.

The present invention will be explained below in more detail by reference to examples and comparative examples, but the invention should not be construed as being limited thereto.

The composition ingredients used in the examples and comparative examples and the evaluation methods used therein are as follows.

1) Composition Ingredients
  (a) Crystalline Propylene Polymer
    a-1) Crystalline propylene homopolymer Melt flow rate, 100 g/10 min
    a-2) Crystalline propylene/ethylene block copolymer Ethylene content, 5 wt % Melt flow rate, 45 g/10 min
  (a') Highly Crystalline Propylene/Ethylene Block Copolymer
    a'-1) Highly crystalline propylene/ethylene block copolymer Ethylene content, 4.5 wt % MFR of the propylene homopolymer part, 200 g/10 min Pentad isotactic index (P) of the propylene homopolymer part, 0.985 Melt flow rate of the block copolymer, 48 g/10 min
    a'-2) Crystalline propylene/ethylene block copolymer Ethylene content, 4.7 wt % MFR of the propylene homopolymer part, 70 g/10 min Pentad isotactic index (P) of the propylene homopolymer part, 0.935 Melt flow rate of the block copolymer, 46 g/10 min
  (b) Ethylene/α-Olefin Rubber
    b-1) Ethylene/propylene rubber EP961SP, manufactured by Japan Synthetic Rubber Co., Ltd., Japan Ethylene content, 77 wt % Mooney viscosity $ML_{1+4}$(100° C.), 63 MFR (230° C., 2.16-kg load), 0.8 g/l10 min
    b-2) Ethylene/propylene rubber EP921, manufactured by Japan Synthetic Rubber Co., Ltd. Ethylene content, 50 wt % Mooney viscosity $ML_{1+4}$(100° C.), 27 MFR (230° C., 2.16-kg load), 4.0 g/10 min
    b-3) Ethylene/butene-1 rubber 2041P, manufactured by Japan Synthetic Rubber Co., Ltd. Ethylene content, 80 wt % MI (190° C., 2.16-kg load), 3.7 g/10 min
  (c) Specified Block Copolymer
    c-1) Ethylene-ethylene/butene-ethylene block copolymer (CEBC) HSB-604, manufactured by Japan Synthetic Rubber Co., Ltd. Structure, A—B—A type MFR (230° C., 2.16-kg load), 1.5 g/10 min Segment A: content, 30 wt % peak melting temperature by DSC, 97° C. Segment B: content, 70 wt %
    c-2) Ethylene-ethylene/propylene block copolymer (CEP) XE103, manufactured by Kuraray, Co., Ltd., Japan Structure, A—B type MFR (230° C., 2.16-kg load), 14 g/10 min Segment A: content, 30 wt % peak melting temperature by DSC, 92° C. Segment B: content, 70 wt %
  (d) Talc
    d-1) Ultrafine talc LMS300, manufactured by Fuji Talc Industry Co., Ltd., Japan Average particle size, 1.3 µm Content of particles with size of 4 µm or more, 2.5 wt %

2) Evaluation Methods
  (1) Melt Flow Rate (g/10 min)
  The pellets obtained were examined under conditions of 230° C. and a load of 2.16 kg (according to ASTM D1238) to evaluate the flowability thereof.
  (2) Flexural Modulus (three-point bending modulus) (MPa)
  Test pieces having a length of 130 mm, a width of 13 mm, and a thickness of 6.4 were molded by injection molding from the pellets obtained, and examined for flexural modulus under conditions of 23° C. (according to ASTM D790) to evaluate the rigidity thereof.
  (3) Heat Distortion Temperature (°C.)
  Test pieces having a length of 130 mm, a width of 13 mm, and a thickness of 6.4 mm were molded by injection molding from the pellets obtained, and examined for heat distortion temperature (according to ASTM D648; load, 455 kPa) to evaluate the high-temperature rigidity thereof.

(4) Tensile Test (MPa, %)

Test pieces having a length of 246 mm, a width of 19 mm, and a thickness of 3.2 mm were molded by injection molding from the pellets obtained, and evaluated by measuring the tensile strength at yield point and tensile elongation at break thereof under conditions of 23° C. (according to ASTM D638).

(5) Izod Impact Strength (J/m)

Test pieces having a length of 63.5 mm, a width of 12.7 mm, and a thickness of 6.4 were molded by injection molding from the pellets obtained. The test pieces were notched and then examined for Izod impact strength at 23° C. (according to ASTM D256) to evaluate the impact resistance thereof.

(6) Average Size of Dispersed Rubber Particles (μm)

The molded tensile test pieces described above were stained with a vapor of ruthenium ($RuO_4$) for 24 hours and then cut at a thickness of from 600 to 900 Å with a diamond knife using an ultramicrotome to produce ultrathin films.

The ultrathin films thus obtained were examined with a transmission electron microscope (JEOL JEM100CX) at a magnification of from 5,000 to 10,000. The electron photomicrographs were statistically processed to determine the average size of dispersed rubber particles. The ultrathin films thus examined had been located at a depth of 0.1 mm from the molding surface.

EXAMPLES 1 TO 6 AND COMPARATIVE EXAMPLES 1 TO 4

To the crystalline propylene homopolymer were added an ethylene/propylene rubber and/or an ethylene/butene-1 rubber, and a specified block copolymer in given amounts (see Table 1). This mixture was stirred with a Henschel mixer (trade name) for 3 minutes, melt-kneaded with twin-screw extruder PCM-45 (manufactured by Ikegai Tekko K. K. Japan), and then pelletized to obtain a polyolefin resin composition. The MFR of the pellets obtained was measured. Test pieces having the given dimensions were molded from the pellets by injection molding at a molding temperature of 220° C. and a mold temperature of 30° C., and then subjected to the evaluation tests. The results obtained are shown in Table 1.

TABLE 1

| | | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Ingredients (parts by weight): | | | | | | | | | | | |
| a-1 | Crystalline Propylene Homopolymer | 75 | 75 | 75 | 75 | 75 | 75 | 75 | 75 | 75 | 75 |
| a-2 | Crystalline Propylene/ethylene Block Copolymer | — | — | — | — | — | — | — | — | — | — |
| b-1 | Ethylene/propylene Copolymer Rubber, Ethylene Content, 77% | 20 | — | — | 10 | 15 | 20 | 25 | — | — | — |
| b-2 | Ethylene/propylene Copolymer Rubber, Ethylene Content, 50% | — | 20 | — | — | — | — | — | 25 | — | — |
| b-3 | Ethylene/butene Copolymer Rubber, Ethylene Content, 80% | — | — | 20 | 10 | — | — | — | — | 25 | — |
| c-1 | Ethylene-ethylene/butene-ethylene Block Copolymer, Structure, A-B-A Type | 5 | 5 | 5 | 5 | 10 | — | — | — | — | 25 |
| c-2 | Ethylene-ethylene/propylene Block Copolymer, Structure, A-B Type Standard Conditions: | — | — | — | — | — | 5 | — | — | — | — |
| (1) | Melt Flow Rate | 32 | 38 | 41 | 35 | 33 | 35 | 31 | 34 | 37 | 30 |
| (2) | Flexural Modulus (MPa) | 890 | 850 | 910 | 900 | 840 | 880 | 970 | 940 | 990 | 580 |
| (3) | Heat Distortion Temperature (°C.) | 103 | 100 | 105 | 105 | 98 | 103 | 105 | 103 | 106 | 76 |
| (4) | Tensile Strength at Yield Point (MPa) | 22.3 | 21.0 | 23.8 | 23.5 | 21.5 | 21.9 | 21.2 | 20.7 | 22.5 | 18.7 |
| | Tensile Elongation at Break (%) | 155 | 103 | 170 | 175 | 150 | 140 | 47 | 40 | 35 | >400 |
| (5) | Izod Impact Strength (J/m) | 280 | 185 | 202 | 200 | 320 | 230 | 43 | 64 | 42 | *1 |
| (6) | Dispersed-particle Size (μm) | 0.6 | 0.5 | 0.5 | 0.7 | 0.5 | 0.8 | 4.0 | 2.5 | 6.0 | ≦0.1 |

Note *1 unbroken

EXAMPLES 7 TO 11 AND COMPARATIVE EXAMPLES 5 TO 8

To the crystalline propylene/ethylene block copolymer were added either an ethylene/propylene rubber or the ethylene/butene-1 rubber, and a specified block copolymer in given amounts (see Table 2). The mixture was treated in the same manner as in Examples 1 to 6 to produce a pelletized polyolefin resin composition, which was subjected to the evaluation tests. The results obtained are shown in Table 2.

TABLE 2

|  |  | Example | | | | | Comparative Example | | | |
|---|---|---|---|---|---|---|---|---|---|---|
|  |  | 7 | 8 | 9 | 10 | 11 | 5 | 6 | 7 | 8 |
|  | Ingredients (parts by weight): | | | | | | | | | |
| a-1 | Crystalline Propylene Homopolymer | — | — | — | — | — | — | — | — | — |
| a-2 | Crystalline Propylene/ethylene Block Copolymer | 85 | 85 | 85 | 85 | 85 | 85 | 85 | 85 | 75 |
| b-1 | Ethylene/propylene Copolymer Rubber, Ethylene Content, 77% | 10 | — | — | 10 | 12 | 15 | — | — | — |
| b-2 | Ethylene/propylene Copolymer Rubber, Ethylene Content, 50% | — | 10 | — | — | — | — | 15 | — | — |
| b-3 | Ethylene/butene Copolymer Rubber, Ethylene Content, 80% | — | — | 10 | — | — | — | — | 15 | — |
| c-1 | Ethylene-ethylene/butene-ethylene Block Copolymer, Structure, A-B-A Type | 5 | 5 | 5 | — | 3 | — | — | — | 25 |
| c-2 | Ethylene-ethylene/propylene Block Copolymer, Structure, A-B Type | — | — | — | 5 | — | — | — | — | — |
|  | Standard Conditions: | | | | | | | | | |
| (1) | Melt Flow Rate | 24 | 28 | 30 | 25 | 23 | 23 | 25 | 33 | 19 |
| (2) | Flexural Modulus (MPa) | 870 | 880 | 920 | 890 | 940 | 940 | 980 | 1020 | 480 |
| (3) | Heat Distortion Temperature (°C.) | 107 | 104 | 109 | 106 | 107 | 104 | 107 | 109 | 72 |
| (4) | Tensile Strength at Yield Point (MPa) | 23.5 | 22.5 | 25.2 | 22.5 | 22.8 | 22.1 | 20.9 | 22.8 | 17.8 |
|  | Tensile Elongation at Break (%) | >400 | >400 | >400 | >400 | >400 | 125 | 88 | 95 | >400 |
| (5) | Izod Impact Strength (J/m) | *1 | *1 | *1 | *1 | *1 | 102 | 98 | 79 | *1 |
| (6) | Dispersed-particle Size (μm) | 0.4 | 0.3 | 0.3 | 0.6 | 0.7 | 2.3 | 2.0 | 2.8 | 0.1 |

Note *1 unbroken

Table 1 (Examples 1 to 6) shows the following. The moldings obtained from the compositions according to the present invention had an average dispersed-rubber particle size of 1 μm or less and an excellent balance between rigidity and impact resistance. In contrast, the compositions of Comparative Examples 1 to 3, not containing a specified block copolymer, gave moldings having an average dispersed-rubber particle size of 2 μm or more and having not only a poor balance between rigidity and impact resistance, in particular poor impact resistance, but also a reduced tensile elongation at break. The composition of Comparative Example 4, containing a specified block copolymer in an amount more than 20% by weight, gave moldings extremely reduced in rigidity and high-temperature rigidity, although having improved impact resistance.

Table 2 (Examples 7 to 11) shows the following. Even the moldings obtained from the compositions employing the crystalline propylene/ethylene block copolymer in place of the crystalline propylene homopolymer in Table 1 had an average dispersed-rubber particle size of 1 μm or less and an excellent balance between rigidity and impact resistance. In contrast, the compositions of Comparative Examples 5 to 7, not containing a specified block copolymer, gave moldings having an average dispersed-rubber particle size of 2 μm or more and having not only a poor balance between rigidity and impact resistance, in particular poor impact resistance, but also a reduced tensile elongation at break, like the moldings shown in Table 1 (Comparative Examples 1 to 3). The composition of Comparative Example 8, containing a specified block copolymer in an amount more than 20% by weight, gave moldings extremely reduced in rigidity and high-temperature rigidity, although having improved impact resistance.

EXAMPLES 12 TO 19 AND COMPARATIVE EXAMPLES 9 TO 15

To the highly crystalline propylene/ethylene block copolymer shown in Table 3 given below were added an ethylene/propylene rubber and/or an ethylene/butene-1 rubber, a specified block copolymer, and talc in the respective amounts shown in Table 3. Thereto were added 0.2 parts by weight each of a heat stabilizer, a neutralizing agent, and a dispersing agent as stabilizers. This mixture was stirred with a Henschel mixer (trade name) for 3 minutes, melt-kneaded with twin-screw extruder PCM-45 (manufactured by Ikegai Tekko K. K.) at 200° C., and then pelletized. Thus, pelletized resin compositions for interior automotive trim parts were obtained as Examples 12 to 19.

On the other hand, according to each of the formulations shown in Table 4 given below, the ingredients were mixed, melt-kneaded, and pelletized in the same manner as in Examples 12 to 19. Thus, resin compositions of Comparative Examples 9 to 15 were obtained. The MFR of each of the pelletized compositions obtained in the Examples and Comparative Examples was measured. Test pieces having the given dimensions were molded from each pelletized composition by injection molding at a molding temperature of 220° C. and a mold temperature of 30° C. and then subjected to the evaluation tests. The results obtained are shown in Tables 3 and 4.

TABLE 3

| | | Example | | | | | | | |
|---|---|---|---|---|---|---|---|---|---|
| | | 12 | 13 | 14 | 15 | 16 | 17 | 18 | 19 |
| | Composition Ingredients (parts by weight): | | | | | | | | |
| a'-1 | Highly Crystalline Propylene/ethylene Block Copolymer, P = 0.985 | 65 | 65 | 65 | 65 | 65 | 65 | 69 | 56 |
| a'-2 | Crystalline Propylene/ethylene Block Copolymer, P = 0.935 | — | — | — | — | — | — | — | — |
| b-1 | Ethylene/propylene Copolymer Rubber, Ethylene Content, 77% | 10 | — | — | 5 | 10 | 12 | 5 | 7 |
| b-2 | Ethylene/propylene Copolymer Rubber, Ethylene Content, 50% | — | 10 | — | — | — | — | — | — |
| b-3 | Ethylene/butene Copolymer Rubber, Ethylene Content, 80% | — | — | 10 | 5 | — | — | 5 | 7 |
| c-1 | Ethylene-ethylene/butene-ethylene Block Copolymer, Structure, A-B-A Type | 5 | 5 | 5 | 5 | — | 3 | 3 | 5 |
| c-2 | Ethylene-ethylene/propylene Block Copolymer, Structure, A-B Type | — | — | — | — | 5 | — | — | — |
| d-1 | Talc | 20 | 20 | 20 | 20 | 20 | 20 | 18 | 25 |
| | Standard Conditions: | | | | | | | | |
| (1) | Melt Flow Rate | 22 | 26 | 27 | 24 | 25 | 23 | 26 | 21 |
| (2) | Flexural Modulus (MPa) | 2320 | 2250 | 2350 | 2340 | 2260 | 2380 | 2250 | 2380 |
| (3) | Heat Distortion Temperature (°C.) | 75 | 73 | 75 | 74 | 70 | 73 | 73 | 75 |
| (4) | Tensile Strength at Yield Point (MPa) | 23.3 | 22.2 | 25.0 | 24.5 | 22.5 | 22.8 | 23.8 | 21.9 |
| | Tensile Elongation at Break (%) | >400 | >400 | >400 | >400 | >400 | >400 | >400 | 280 |
| (5) | Izod Impact Strength (J/m) | 190 | 200 | 162 | 183 | 192 | 180 | 220 | 185 |
| (6) | Dispersed-particle Size (μm) | 0.5 | 0.4 | 0.6 | 0.6 | 0.9 | 0.8 | 0.6 | 0.8 |

TABLE 4

| | | Comparative Example | | | | | | |
|---|---|---|---|---|---|---|---|---|
| | | 9 | 10 | 11 | 12 | 13 | 14 | 15 |
| | Composition Ingredients (parts by weight): | | | | | | | |
| a'-1 | Highly Crystalline Propylene/ethylene Block Copolymer | 65 | 65 | 65 | 55 | 55 | — | — |
| a'-2 | Crystalline Propylene/ethylene Block Copolymer, P = 0.935 | — | — | — | — | — | 65 | 45 |
| b-1 | Ethylene/propylene Copolymer Rubber, Ethylene Content, 77% | 15 | — | — | — | — | 10 | 15 |
| b-2 | Ethylene/propylene Copolymer Rubber, Ethylene Content, 50% | — | 15 | — | — | — | — | — |
| b-3 | Ethylene/butene Copolymer Rubber, Ethylene Content, 80% | — | — | 15 | — | — | — | — |
| c-1 | Ethylene-ethylene/butene-ethylene Block Copolymer, Structure, A-B-A Type | — | — | — | 25 | — | 5 | 5 |
| c-2 | Ethylene-ethylene/propylene Block Copolymer, Structure, A-B Type | — | — | — | — | 25 | — | — |
| d-1 | Talc | 20 | 20 | 20 | 20 | 20 | 20 | 35 |
| | Standard Conditions: | | | | | | | |
| (1) | Melt Flow Rate | 22 | 24 | 28 | 17 | 25 | 23 | 13 |
| (2) | Flexural Modulus (MPa) | 2380 | 2300 | 2410 | 1670 | 1520 | 2090 | 2240 |
| (3) | Heat Distortion Temperature (°C.) | 75 | 73 | 75 | 58 | 56 | 68 | 70 |
| (4) | Tensile Strength at Yield Point (MPa) | 21.3 | 22.9 | 23.5 | 18.7 | 17.3 | 20.6 | 16.9 |
| | Tensile Elongation at Break (%) | 96 | 84 | 78 | >400 | >400 | >400 | 42 |
| (5) | Izod Impact Strength (J/m) | 98 | 93 | 82 | *1 | *1 | 204 | 185 |
| (6) | Dispersed-particle Size (μm) | 2.5 | 2.0 | 3.0 | 0.1 | 0.1 | 0.7 | 1.0 |

Note *1 unbroken

As apparent from Table 3 (Examples 12 to 19), the compositions according to the present invention showed excellent flowability and gave moldings having an average dispersed-rubber particle size of 1 μm or less and excellent in rigidity and impact resistance. Specifically, the resin compositions for interior automotive trim parts obtained in the examples satisfied the performance required of interior automotive trim parts. That is, the resin compositions had an MFR of 20 g/10 min or more and the moldings obtained from the resin compositions had a flexural modulus at ordinary temperature of 2,200 MPa or more, a heat distortion temperature of 70° C. or more, and an Izod impact strength at ordinary temperature of 150 J/m or more.

In contrast, the compositions of Comparative Examples 9 to 11, not containing a specified block copolymer (c), gave moldings having an average dispersed-rubber particle size of 2 μm or more and having not only a poor balance between rigidity and impact resistance, in particular poor impact resistance, but also a reduced tensile elongation at break. The compositions of Comparative Examples 12 and 13, containing a specified block copolymer (c) in an amount more than 20% by weight, are unsuitable for practical use because they gave moldings extremely reduced in rigidity and high-temperature rigidity, although having improved impact resistance. The composition of Comparative Example 14, employing an ordinary crystalline propylene/ ethylene block copolymer in place of a highly crystalline propylene/ethylene block copolymer, is undesirable in that the rigidity and high-temperature rigidity thereof were poor although it had improved impact resistance. The composition of Comparative Example 15, containing talc in an amount more than 30% by weight, is unsuitable for practical use because it had poor flowability and a reduced tensile elongation at break due to the incorporation of the large amount of talc.

Since the polyolefin resin composition of the present invention has excellent dispersibility of the rubber used, moldings having an excellent balance between rigidity and impact resistance are obtained therefrom. The composition is hence suitable for use in the field of moldings required to have rigidity and impact resistance.

Furthermore, since the resin composition for interior automotive trim parts of the present invention has excellent dispersibility of the rubber ingredient, not only the moldings obtained therefrom are excellent in rigidity and impact resistance, but also the melt of the resin composition shows excellent flowability. Consequently, the resin composition is suitable for use in the production of interior automotive trim parts.

While the invention has been described in detail and with reference to specific embodiments thereof, it will be apparent to one skilled in the art that various changes and modifications can be made therein without departing from the spirit and scope thereof.

What is claimed is:

1. A polyolefin resin composition comprising (a) a crystalline propylene polymer in an amount of 40% or more to less than 95% by weight, (b) a particulate ethylene/α-olefin rubber in an amount of from 5 to 40% by weight, and (c) a linear or branched specified block copolymer in an amount of from 0.1 to 20% by weight containing a polyethylene block segment A having a melting temperature as measured with a differential scanning calorimeter of from 80° to 120° C. and an ethylene/α-olefin copolymer block segment B, the total content of components (a), (b), and (c) being 100% by weight.

2. The polyolefin resin composition as claimed in claim 1, wherein the crystalline propylene polymer (a) is at least one member selected from the group consisting of a crystalline propylene homopolymer and a crystalline propylene/ ethylene block copolymer.

3. The polyolefin resin composition as claimed in claim 1, wherein the ethylene/α-olefin rubber (b) is at least one member selected from the group consisting of an ethylene/ propylene rubber and an ethylene/butene-1 rubber.

4. The polyolefin resin composition as claimed in claim 1, wherein the ethylene/α-olefin block segment B is at least one member selected from the group consisting of an ethylene/butene copolymer and an ethylene/propylene copolymer.

5. The polyolefin resin composition as claimed in claim 1 wherein said copolymer block segment B is an ethylene/ butene copolymer.

6. The polyolefin resin composition as claimed in claim 1 wherein said copolymer block segment B is an ethylene/ propylene copolymer.

7. The polyolefin resin composition as claimed in claim 5 wherein the ethylene content in said block segment B is 20 to 80% by weight.

8. The polyolefin resin composition as claimed in claim 1 wherein component (c) is a diblock copolymer comprising a polyethylene block and an ethylene/butene copolymer block.

9. The polyolefin resin composition as claimed in claim 1 wherein component (c) is a triblock copolymer comprising a polyethylene block, an ethylene/butene block and a polyethylene block.

10. The polyolefin resin composition as claimed in claim 1 wherein component (c) is a diblock copolymer comprising a polyethylene block and an ethylene/propylene copolymer block.

11. The polyolefin resin composition as claimed in claim 1, wherein said particulate ethylene/α-olefin rubber has an average dispersed particle size of no more than 1 μm.

* * * * *

UNITED STATES PATENT AND TRADEMARK OFFICE
CERTIFICATE OF CORRECTION

PATENT NO. : 5,708,083
DATED : January 13, 1998
INVENTOR(S) : Kawamura et al.

It is certified that error appears in the above-identified patent and that said Letters Patent is hereby corrected as shown below:

On the title page,
Insert:    --[73] Assignees:    Chisso Corporation, Osaka;
Toyota Jidosha Kabushiki
Kaisha, Toyota, both of Japan--

Signed and Sealed this

First Day of June, 1999

Attest:

Q. TODD DICKINSON

*Attesting Officer*         *Acting Commissioner of Patents and Trademarks*